United States Patent
Oo et al.

(10) Patent No.: US 11,992,859 B2
(45) Date of Patent: May 28, 2024

(54) SLURRY COATING LEVELING

(71) Applicant: RTX Corporation, Farmington, CT (US)

(72) Inventors: Guolin Oo, Singapore (SG); Tracy A. Propheter-Hinckley, Rocky Hill, CT (US)

(73) Assignee: RTX CORPORATION, Farmington, CT (US)

( * ) Notice: Subject to any disclaimer, the term of this patent is extended or adjusted under 35 U.S.C. 154(b) by 334 days.

(21) Appl. No.: 17/238,356

(22) Filed: Apr. 23, 2021

(65) Prior Publication Data
US 2022/0339667 A1 Oct. 27, 2022

(51) Int. Cl.
*B05D 1/42* (2006.01)
*B05C 11/02* (2006.01)
*B05C 11/04* (2006.01)
*B05D 3/12* (2006.01)

(52) U.S. Cl.
CPC .............. *B05D 1/42* (2013.01); *B05C 11/041* (2013.01); *B05D 3/12* (2013.01); *B05C 11/023* (2013.01)

(58) Field of Classification Search
CPC ..... B29C 59/026; B29C 73/02; B29C 64/214; B29C 64/227; B29C 64/232; B05C 11/041; B05C 11/023; B05C 11/04; B05C 11/044; B05C 11/045; B33Y 30/00; B33Y 40/00; B22F 10/60; B22F 10/66
USPC ......................................................... 118/100
See application file for complete search history.

(56) References Cited

U.S. PATENT DOCUMENTS

| 5,454,868 | A | 10/1995 | Mendez |
| 7,879,393 | B2 | 2/2011 | Ederer et al. |
| 9,463,488 | B2 | 10/2016 | Ederer et al. |
| 2013/0195333 | A1 | 8/2013 | Singh et al. |
| 2018/0194074 | A1* | 7/2018 | Shi ........................ B23K 26/342 |
| 2018/0369855 | A1 | 12/2018 | Pidan et al. |

FOREIGN PATENT DOCUMENTS

| JP | H07163931 A | 6/1995 |
| JP | 2006142214 A | 6/2006 |

OTHER PUBLICATIONS

CN109890515, Schneider et al., published Jun. 14, 2019 (Year: 2019).*
EP 3628422, Prakash et al., published Apr. 1, 2020 (Year: 2020).*
European Search Report for European Application No. 22169335.1; dated Oct. 5, 2022; 6 pages.

* cited by examiner

*Primary Examiner* — Dah-Wei D. Yuan
*Assistant Examiner* — Stephen A Kitt
(74) *Attorney, Agent, or Firm* — CANTOR COLBURN LLP

(57) ABSTRACT

Disclosed herein is a system for slurry coating leveling. The system includes a guide frame and a scrapper apparatus coupled to the guide frame. The scrapper apparatus includes a plurality of scrapper fingers aligned substantially parallel to each other. The system also includes a contour guide coupled to the scrapper fingers. The contour guide is configured to guide movement of the scrapper fingers across a surface of a component having a slurry coating. The scrapper fingers conform to a contour profile of the surface to level the slurry coating on the surface of the component.

18 Claims, 8 Drawing Sheets

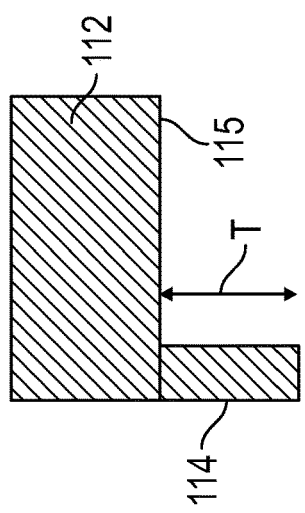
FIG. 6
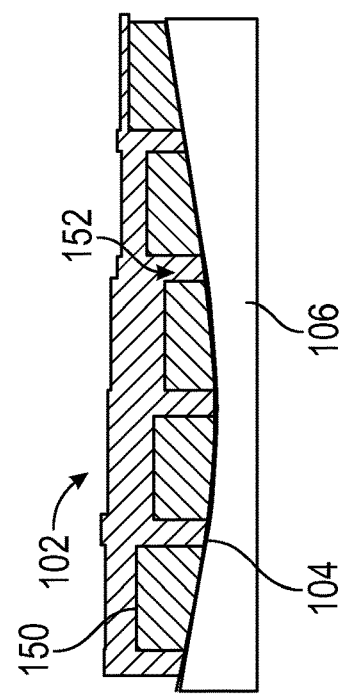
FIG. 7
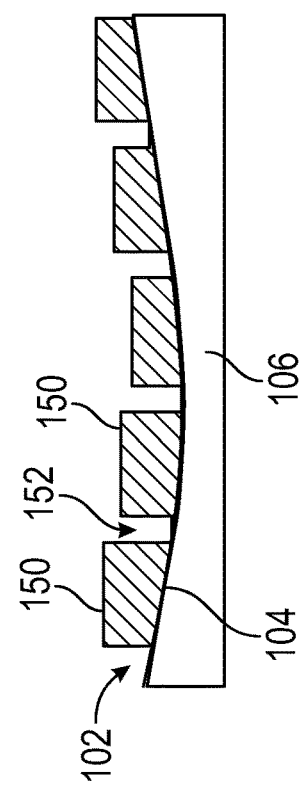

SLURRY COATING LEVELING

BACKGROUND

Exemplary embodiments of the present disclosure pertain to the art of manufacturing, and more particularly to slurry coating leveling during a manufacturing or component repair process.

Manufacturing and repair processes for some types of components can include application of a coating material applied as a slurry. The slurry can include a metal mixture applied through spraying or dipping a portion of a solid component followed by a drying process to harden the slurry and bind the coating to the solid surface of the component. The thickness of slurry material applied onto surfaces plays a role in the subsequent content diffusion into the coated parts. There is a need to maintain an appropriate range of coating thickness applied as a slurry on surfaces, particularly surfaces with complex geometries. Manual application of slurry coating can lead to uneven application of the coating on various surfaces of a part.

BRIEF DESCRIPTION

Disclosed is a system for slurry coating leveling. The system includes a guide frame and a scrapper apparatus coupled to the guide frame. The scrapper apparatus includes a plurality of scrapper fingers aligned substantially parallel to each other. The system also includes a contour guide coupled to the scrapper fingers. The contour guide is configured to guide movement of the scrapper fingers across a surface of a component having a slurry coating. The scrapper fingers conform to a contour profile of the surface to level the slurry coating on the surface of the component.

In addition to one or more of the features described above, or as an alternative to any of the foregoing embodiments, the scrapper fingers can each have a guide probe that is offset from a scrapper finger end to define a desired slurry thickness.

In addition to one or more of the features described above, or as an alternative to any of the foregoing embodiments, the guide probe of each of the scrapper fingers can be retractable.

In addition to one or more of the features described above, or as an alternative to any of the foregoing embodiments, the system can include a controller configured to extend the guide probe of each of the scrapper fingers to perform an initial leveling of the slurry coating and retract the guide probe of each of the scrapper fingers prior to performing a final leveling of the slurry coating.

In addition to one or more of the features described above, or as an alternative to any of the foregoing embodiments, the controller can be configured to wait for a predetermined hardening time between the initial leveling and the final leveling of the slurry coating.

In addition to one or more of the features described above, or as an alternative to any of the foregoing embodiments, the contour guide can include a plurality of contour guide rails, each of the contour guide rails controlling a vertical position of at least one of the scrapper fingers as the scrapper apparatus moves with respect to the component.

In addition to one or more of the features described above, or as an alternative to any of the foregoing embodiments, the contour guide can include a scrapper frame coupled to the guide frame and a spring bar coupled to the scrapper frame.

In addition to one or more of the features described above, or as an alternative to any of the foregoing embodiments, each of the scrapper fingers can be respectively coupled by a spring to the spring bar to adjust positioning of the scrapper fingers to trace the contour profile of the surface of the component.

In addition to one or more of the features described above, or as an alternative to any of the foregoing embodiments, the scrapper fingers can each include a scrapper finger end that is substantially flat.

In addition to one or more of the features described above, or as an alternative to any of the foregoing embodiments, the system can include an enclosure, wherein the guide frame is moveable relative to the component within the enclosure.

Also disclosed is a method for slurry coating leveling on a component. The method can include positioning a scrapper apparatus proximate to a component comprising a slurry coating, where the scrapper apparatus is coupled to a guide frame. The scrapper apparatus includes a plurality of scrapper fingers aligned substantially parallel to each other. The method also includes guiding movement of the scrapper fingers across a surface of the component comprising the slurry coating using a contour guide, where the scrapper fingers conform to a contour profile of the surface to level the slurry coating on the surface of the component.

In addition to one or more of the features described above, or as an alternative to any of the foregoing embodiments, the method can include extending the guide probe of each of the scrapper fingers to perform an initial leveling of the slurry coating, and retracting the guide probe of each of the scrapper fingers prior to performing a final leveling of the slurry coating.

In addition to one or more of the features described above, or as an alternative to any of the foregoing embodiments, the method can include waiting for a predetermined hardening time between the initial leveling and the final leveling of the slurry coating.

In addition to one or more of the features described above, or as an alternative to any of the foregoing embodiments, the method can include adjusting positioning of the scrapper fingers to trace the contour profile of the surface of the component by the scrapper fingers, each of the scrapper fingers respectively coupled to a spring that is coupled to the spring bar.

In addition to one or more of the features described above, or as an alternative to any of the foregoing embodiments, the method can include controlling movement of the guide frame relative to the component within an enclosure.

BRIEF DESCRIPTION OF THE DRAWINGS

The following descriptions should not be considered limiting in any way. With reference to the accompanying drawings, like elements are numbered alike:

FIG. 6 is a schematic view of a scrapper finger and guide probe for slurry coating leveling according to an embodiment;

FIG. 7 is a partial sectional view of reapplication of a slurry coating according to an embodiment;

DETAILED DESCRIPTION

A detailed description of one or more embodiments of the disclosed apparatus and method are presented herein by way of exemplification and not limitation with reference to the Figures.

Slurry coatings can be used in manufacturing and/or repair processes on one or more targeted surfaces of a component. Embodiments apply an excess level of a slurry coating and use a system for slurry coating leveling to ensure that a desired slurry coating thickness uniformly remains on component surfaces. The application of slurry coating in various stages of processing may occur in various forms, such as dipping, spraying, or other suitable methods. The slurry coating process can include multiple applications of slurry coating. An initial slurry coating application can be followed by scrapping the slurry coating while using guide probes to establish a desired slurry coating thickness. Once the slurry coating sets into a hardened form after an initial leveling, reapplication of the slurry coating can be performed to fill in gaps that are made by the guide probes. A second or final leveling can be performed after the reapplication of slurry without using the guide probes such that slurry coating fills in the gaps from the initial leveling. The final leveling can allow the slurry coating to remain between the gaps in previously set slurry coating while removing excess material from the top of the hardened slurry material. The use of multiple scrapper fingers in parallel that can have different vertical positions enables the desired slurry thickness to be established to conform to a contour profile of a surface of the component.

Figure 1:
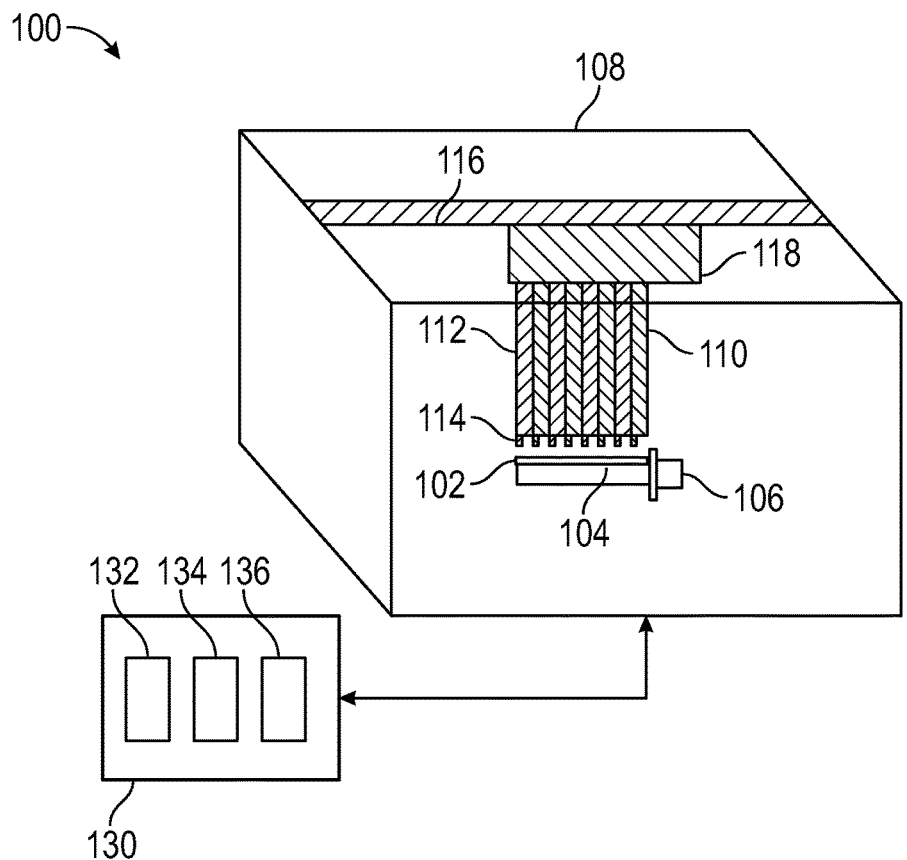
FIG. 1 is a schematic view of a system for slurry coating leveling according to an embodiment.

FIG. 1 shows a schematic view of a system 100 for slurry coating leveling according to an embodiment. In the example of FIG. 1, a slurry coating 102 can be applied on a surface 104 of a component 106, and the component 106 can be placed within an enclosure 108 while the slurry coating 102 is partially viscous. The system 100 can include a scrapper apparatus 110 that includes a plurality of scrapper fingers 112 aligned substantially parallel to each other. The scrapper fingers 112 can each include a guide probe 114 to establish a desired slurry thickness in the slurry coating 102. The system 100 can also include a guide frame 116 coupled to the scrapper apparatus 110. For example, the scrapper apparatus 110 can be coupled to the guide frame 116 by a contour guide 118. In some embodiments, the guide frame 116 can be fixed onto the top of the enclosure 108, and the contour guide 118 can connect to the guide frame 116 with the scrapper fingers 112 held by the contour guide 118. The scrapper apparatus 110 can be moved relative to the component 106 or the component 106 can be moved relative to the scrapper apparatus 110. For example, the guide frame 116 may be actuated using a motor to move the guide frame 116 and/or the contour guide 118.

The system 100 can also include a controller 130 configured to control movement of the scrapper fingers 112 across the surface 104 of the component 106 including the slurry coating 102, where the scrapper fingers 112 conform to a contour profile of the surface 104 to level the slurry coating 102 on the surface 104 of the component 106. Before applying the slurry coating 102, the scrapper fingers 112, without the guide probes 114 extended, can be initially moved across the surface 104 of the component 106 to measure the exact location of the surface 104, and the serial number of the component 106 can be recorded. The component 106 can be removed, slurry coated, and returned to the system 100, which reads the serial number and runs the scrapper fingers 112 across a previously programmed offset of the surface 104 by a desired slurry thickness. A controller-based implementation may also adjust the desired slurry thickness at different locations on the surface 104, such as tapering the slurry thickness proximate to a trailing edge to enhance aerodynamics.

The controller 130 can include a processing system 132 and a memory system 134, where the memory system 134 stores executable instructions to configure the processing system 132 to perform a plurality of operations. The processing system 132 can include any type or combination of central processing unit (CPU), including one or more of: a microprocessor, a digital signal processor (DSP), a microcontroller, an application specific integrated circuit (ASIC), a field programmable gate array (FPGA), or the like. The memory system 134 can store data and instructions that are executed by the processing system 132. In embodiments, the memory system 134 may include random access memory (RAM), read only memory (ROM), or other electronic, optical, magnetic, or any other computer readable medium onto which is stored data and algorithms in a non-transitory form. The controller 130 can also include an input/output (I/O) interface 136 operable to interface with various components of the system 100 to sense, control, and communicate with components of FIG. 1 and other components (not depicted), such as a user interface.

As one example, the controller 130 may be configured to control the positioning of the scrapper apparatus 110 and/or the component 106. The controller 130 may be configured to control the addition or removal of the slurry coating 102 on the surface 104 of the component 106, such as through a spray, dip, or flow process. Alternatively, application of the slurry coating 102 is performed using a different apparatus and is not directly controlled by the controller 130.

Figure 2:
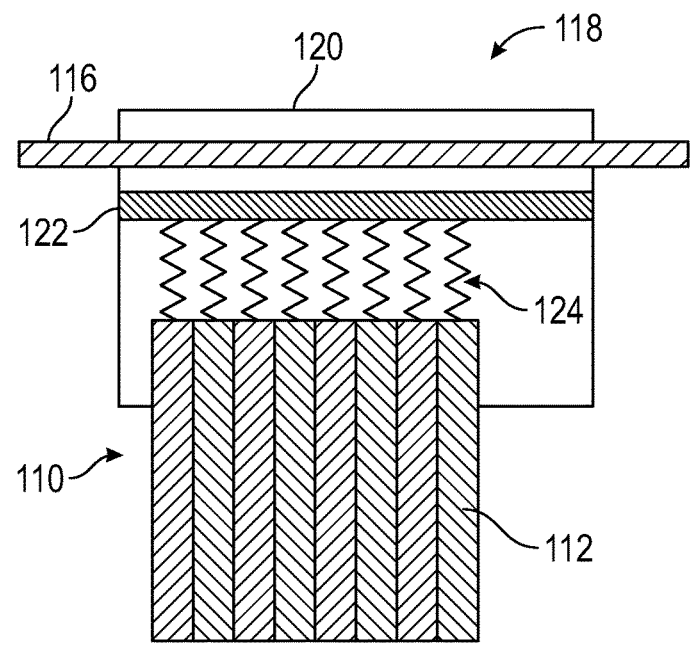
FIG. 2 is an enhanced view of a portion of the system of FIG. 1 according to an embodiment.

The scrapper fingers 112 can be individually actuated with assistance of a spring mechanism, which facilitates axial movement of the scrapper fingers 112 as depicted in the example of FIG. 2. A contour guide 118 can be coupled to the scrapper fingers 112 to guide movement of the scrapper fingers 112. The contour guide 118 can include a scrapper frame 120 coupled to the guide frame 116 and a spring bar 122 coupled to the scrapper frame 120. Each of the scrapper fingers 112 can be respectively coupled by a spring 124 to the spring bar 122 to adjust positioning of the scrapper fingers 112 to trace the contour profile of the surface 104 of the component 106.

Figure 3:
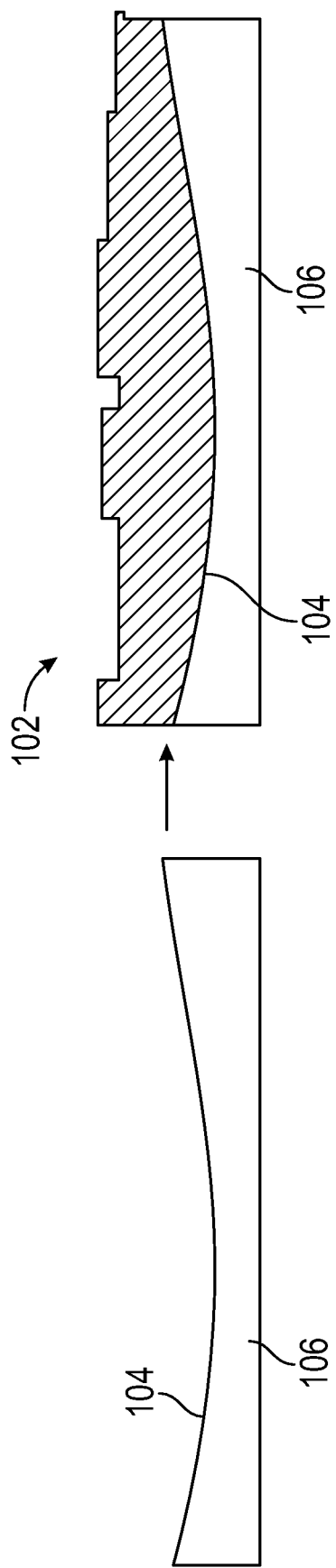
FIG. 3 is a partial sectional view of an initial application of a slurry coating according to an embodiment.

FIG. 3 is a partial sectional view of an initial application of the slurry coating 102 according to an embodiment. As can be seen in FIG. 3, the surface 104 of the component 106 to be coated may have a complex contour, such as an airfoil, which adds to the complexity of establishing a uniform thickness of the slurry coating 102.

Figure 4:
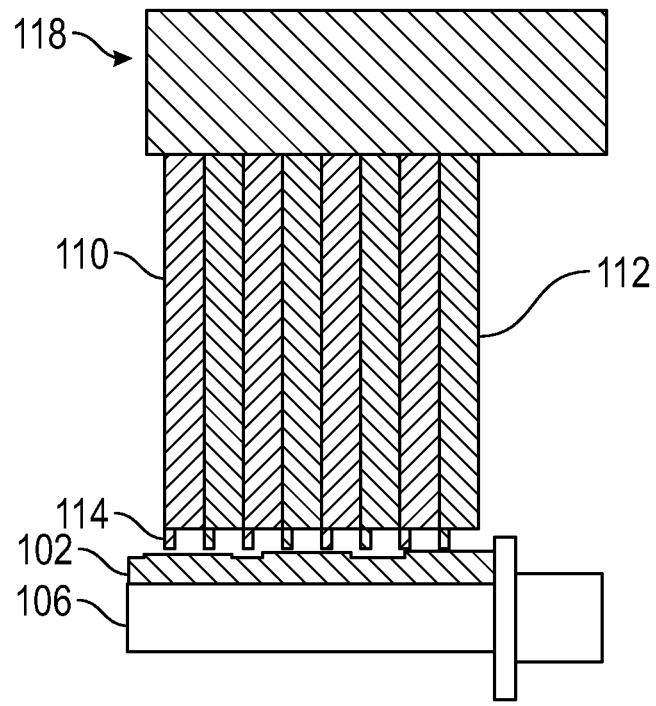
FIG. 4 is a schematic view of an initial leveling of a slurry coating according to an embodiment.
Figure 5:
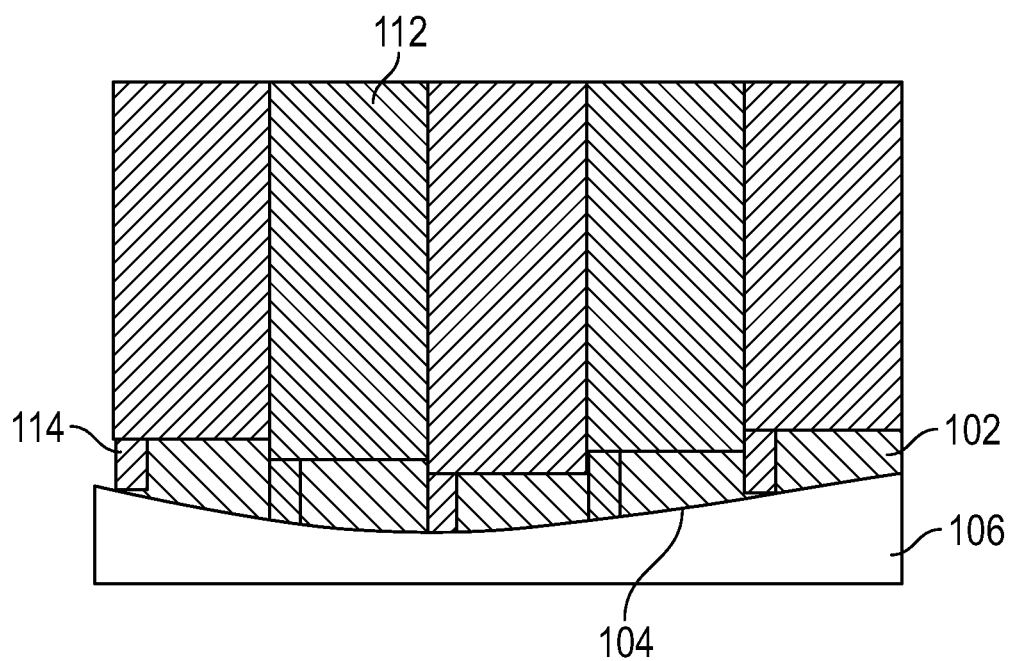
FIG. 5 is an enhanced view of an initial leveling of a slurry coating according to an embodiment.
Figure 8:
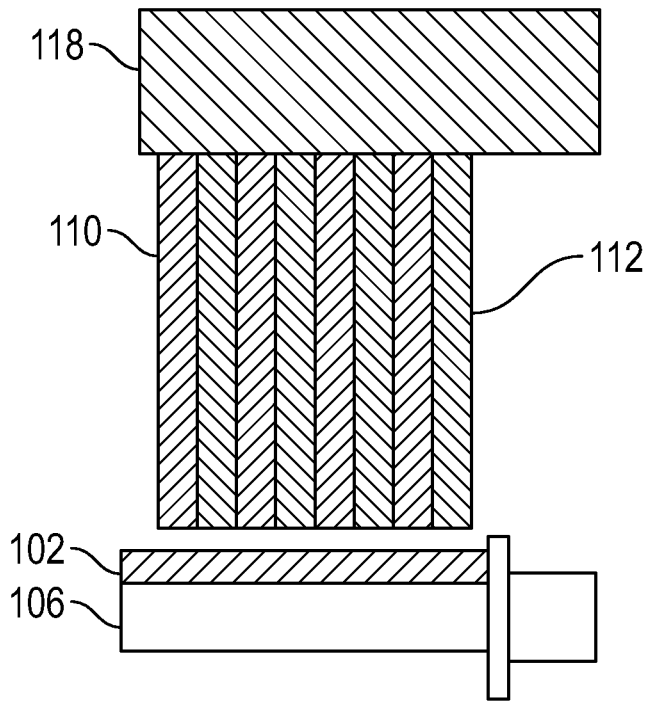
FIG. 8 is a schematic view of a final leveling of a slurry coating according to an embodiment.
Figure 9:
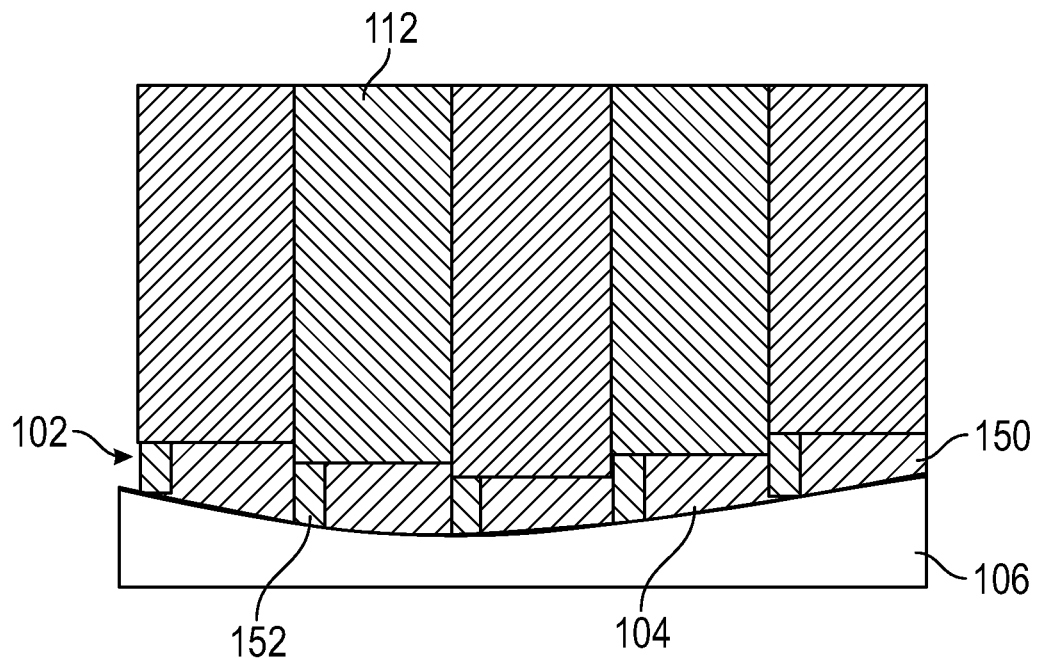
FIG. 9 is an enhanced view of a final leveling of a slurry coating according to an embodiment.
Figure 10:
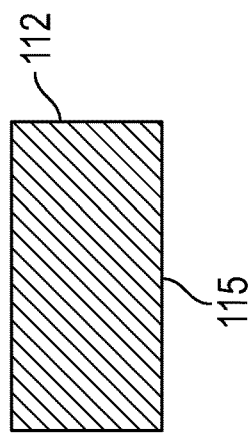
FIG. 10 is a schematic view of a scrapper finger for final slurry coating leveling according to an embodiment.
Figure 11:
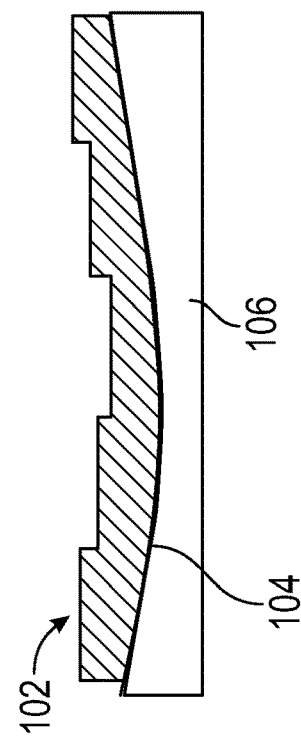
FIG. 11 is a partial sectional view of final leveling of a slurry coating according to an embodiment.
Figure 11:
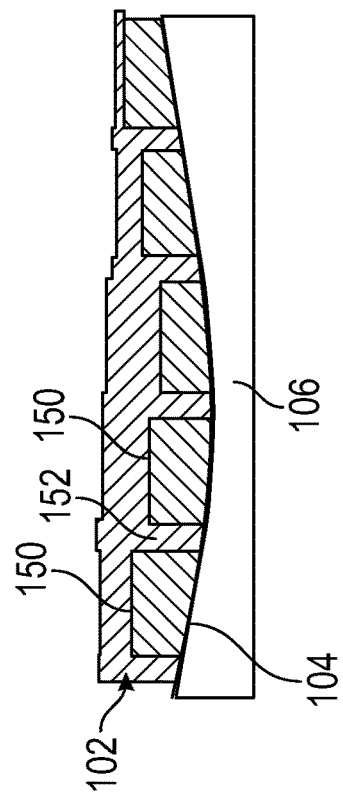

FIG. 4 is a schematic view of an initial leveling of slurry coating 102 using the scrapper apparatus 110 according to an embodiment. For example, the controller 130 of FIG. 1 can position the contour guide 118. As the scrapper fingers 112 are positioned to contact the slurry coating 102, the guide probes 114 on each of the scrapper fingers 112 can contact the surface 104 of the component 106 as depicted in FIG. 5. Each guide probe 114 can be offset from a scrapper finger end 115 to define a desired slurry thickness (T) as depicted in FIG. 6. The curvature of the surface 104 can result in subsections of the slurry coating 102 that are slightly thicker or thinner that the desired slurry thickness (T). The scrapper fingers 112 can be sized to appropriate dimensions per the desired resolution for a given application. Opposite the spring end of the scrapper fingers 112 are contact points which interface with the surface 104 and/or the slurry coating 102. The contact points may include one or more guide probes 114 for initial levelling and a flat surface for finishing. Each of the scrapper finger ends 115 may be substantially flat and extend over a greater width than each of the guide probes 114. For example, the width of each guide probe 114 may be about one-eighth of the width of each scrapper finger end 115.

During initial leveling, the scrapper fingers 112 with the guide probes 114 can be traced along the surface 104 of the component 106 with the slurry coating 102, such as slurry-coated turbine airfoils. The length of the guide probe 114 extending out from the scrapper finger end 115 of the scrapper finger 112 establishes the desired slurry thickness (T) and in some instances may be adjustable to support a range of thicknesses. Adjustments may occur in real-time during scrapping to dynamically adjust the desired slurry thickness (T) at specific locations on the component 106. With the effects of gravity, spring loading of the springs 124 can adjust accordingly along the path on conically variable surfaces. While the guide probes 114 maintain contact with the component 106 to ensure the appropriate thickness, the flat surface of the scrapper finger end 115 levels the slurry coating 102 and pushes excess slurry along the movement path. The end result is a leveled application of the slurry coating 102 of the desired slurry thickness (T) separated into segments 150 (FIG. 7), with gaps (or grooves) 152 between the segments 150 corresponding to the paths of the guide probes 114 through the slurry coating 102.

The initial layer of slurry coating 102 may be processed or dried to create a different consistency as compared to fresh slurry coating. The slurry coating 102 can be reapplied over the segments 150 with gaps 152 to fill in the gaps 152 as depicted in FIG. 7. During the finishing, as depicted in FIGS. 8, 9, 10, and 11, the scrapper fingers 112 without the guide probes 114 are traced along the slurry coating 102 as a final leveling. With the bulk of the desired slurry thickness completed, the applied slurry coating 102 fills the gaps 152 previously created by the guide probes 114. The guide probes 114 may be detachable from the scrapper fingers 112 or may retract/extend from the scrapper fingers 112. Alternatively, there can be separate systems 100 as part of a processing line, where one instance of system 100 includes scrapper fingers 112 with guide probes 114 and another instance of system 100 includes scrapper fingers 112 without guide probes 114. Thus, the component 106 can be manually transferred or transferred through automation between the separate instances of the system 100 as needed.

Figure 12:
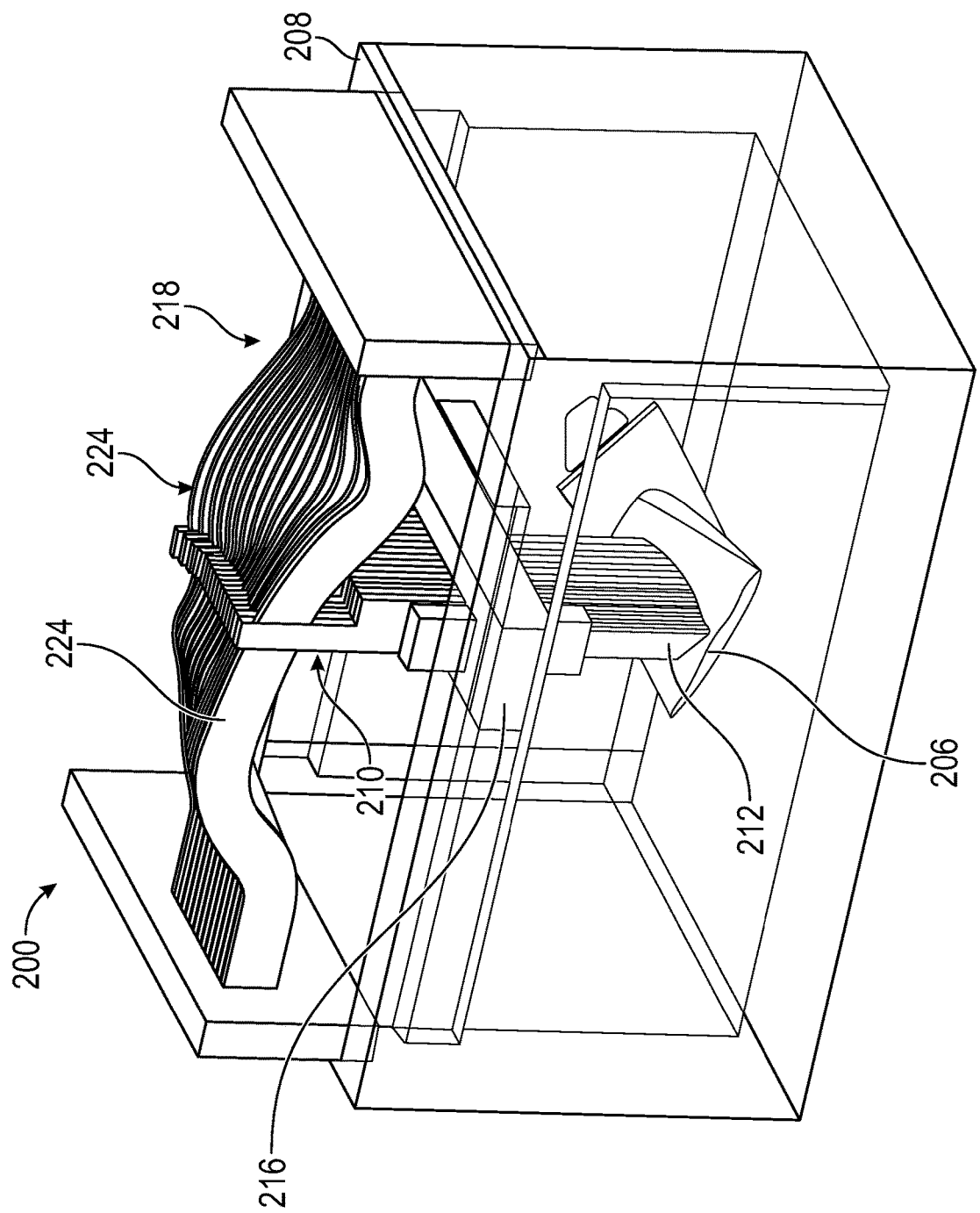
FIG. 12 is a schematic view of a system for slurry coating leveling according to an embodiment.

FIG. 12 is a schematic view of a system 200 for slurry coating leveling according to an embodiment. In the example of FIG. 12, a slurry-coated component 206 can be placed within an enclosure 208 before the slurry has fully set. The system 200 includes a scrapper apparatus 210 that includes a plurality of scrapper fingers 212 aligned substantially parallel to each other. Rather than requiring multiple passes with and without guide probes 114 of FIG. 1, the system 200 includes a contour guide 218 that establishes an individualized thickness per scrapper finger 212 to match complex contours of the slurry-coated component 206 as guide frame 216 slides within the enclosure 208. In the example of FIG. 12, the contour guide 218 includes a plurality of contour guide rails 224, where each of the contour guide rails 224 controls a vertical position of at least one of the scrapper fingers 212 as the scrapper apparatus 210 moves with respect to the slurry-coated component 206.

Figure 13:
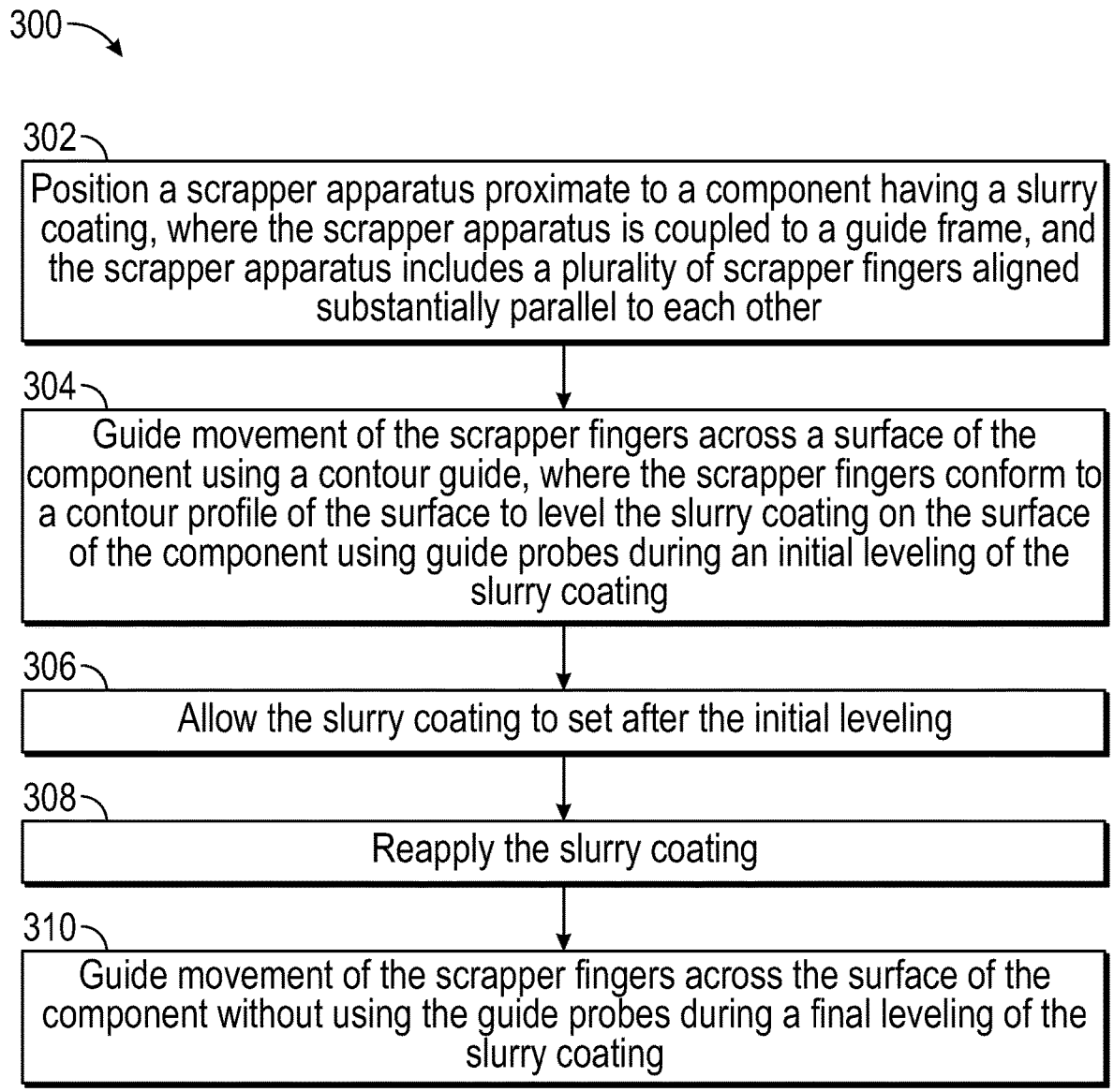
FIG. 13 is a process flow according to an embodiment.

Turning to FIG. 13, a flowchart shows a method 300 for leveling a slurry coating 102 on a component 106 according to an embodiment. The method 300 of FIG. 13 is described with respect to FIGS. 1-13 and may include additional steps beyond those depicted in FIG. 13. The method 300 can be controlled by a control system, such as the controller 130 of FIG. 1, or may be performed in part by one or more human operators. For instance, some portions of the method 300 can be manually performed depending on the amount of automation available. The method 300 is described primarily in reference to various examples from FIGS. 1-12 for purposes of explanation, although it will be understood that variations and sub-combinations of previously described elements and/or additional elements can be used to implement the method 300.

Initially, an amount of a slurry coating 102 can be applied to surface 104 of a component 106, as illustrated in the example of FIGS. 1-3. At block 302, the scrapper apparatus 110 can be positioned proximate to a component 106 including a slurry coating 102, where the scrapper apparatus 110 is coupled to a guide frame 116, and the scrapper apparatus 110 includes a plurality of scrapper fingers 112 aligned substantially parallel to each other.

At block 304, movement of the scrapper fingers 112 across a surface of the component 106 can be guided using a contour guide 118. Alternatively, contour guide 218 can be used. In some embodiments, the controller 130 can control movement of the scrapper fingers 112 across a surface 104 of the component 106 including the slurry coating 102, where the scrapper fingers 112 conform to a contour profile of the surface 104 to level the slurry coating 102 on the surface 104 of the component 106. During initial leveling, the guide probes 114 can be used to establish the desired slurry thickness (T). At block 306, the slurry coating 102 is allowed to set after the initial leveling. The drying and hardening of the slurry coating 102 can be accelerated using temperature, airflow, and/or other adjustments.

At block 308, the slurry coating 102 is reapplied after the initial leveling to fill in the gaps 152 between segments 150. Reapplication can be performed external to the system 100 or the system 200. At block 310, movement of the scrapper fingers 112 across the surface 104 of the component 106 can be guided without using the guide probes 114 during a final leveling of the slurry coating 102. For example, the guide probes 114 can be retracted or detached from the scrapper fingers 112. Alternatively, separate systems 100 can be used with and without guide probes 114. In embodiments, the guide probe 114 of each of the scrapper fingers 112 can be extended to perform initial leveling of the slurry coating 102 and retracted to perform the final leveling of the slurry coating 102. The controller 130 can be configured to wait for a predetermined hardening time between the initial leveling and the final leveling of the slurry coating 102.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A system for slurry coating leveling, the system comprising:
   a guide frame;
   a scrapper apparatus coupled to the guide frame, the scrapper apparatus comprising a plurality of scrapper fingers aligned substantially parallel to each other; and
   a contour guide coupled to the scrapper fingers, the contour guide configured to guide movement of the scrapper fingers across a surface of a component comprising a slurry coating, wherein the scrapper fingers conform to a contour profile of the surface to level the slurry coating on the surface of the component, wherein the scrapper fingers each comprise a guide probe that is offset from a scrapper finger end to define a desired slurry thickness.

2. The system of claim 1, wherein the guide probe of each of the scrapper fingers is retractable.

3. The system of claim 2, further comprising a controller configured to extend the guide probe of each of the scrapper fingers to perform an initial leveling of the slurry coating and retract the guide probe of each of the scrapper fingers prior to performing a final leveling of the slurry coating.

4. The system of claim 3, wherein the controller is configured to wait for a predetermined hardening time between the initial leveling and the final leveling of the slurry coating.

5. A system for slurry coating leveling, the system comprising:
   a guide frame;
   a scrapper apparatus coupled to the guide frame, the scrapper apparatus comprising a plurality of scrapper fingers aligned substantially parallel to each other; and
   a contour guide coupled to the scrapper fingers, the contour guide configured to guide movement of the scrapper fingers across a surface of a component comprising a slurry coating, wherein the scrapper fingers conform to a contour profile of the surface to level the slurry coating on the surface of the component, wherein the contour guide comprises a plurality of contour guide rails, each of the contour guide rails controlling a vertical position of at least one of the scrapper fingers as the scrapper apparatus moves with respect to the component.

6. The system of claim 1, wherein the contour guide comprises a scrapper frame coupled to the guide frame and a spring bar coupled to the scrapper frame.

7. The system of claim 6, wherein each of the scrapper fingers is respectively coupled by a spring to the spring bar to adjust positioning of the scrapper fingers to trace the contour profile of the surface of the component.

8. The system of claim 1, wherein the scrapper fingers each comprise a scrapper finger end that is substantially-flat planar.

9. The system of claim 1, further comprising an enclosure, wherein the guide frame is moveable relative to the component within the enclosure.

10. A method for slurry coating leveling on a component, the method comprising:
    positioning a scrapper apparatus proximate to a component comprising a slurry coating, wherein the scrapper apparatus is coupled to a guide frame, the scrapper apparatus comprising a plurality of scrapper fingers aligned substantially parallel to each other; and
    guiding movement of the scrapper fingers across a surface of the component comprising the slurry coating using a contour guide, wherein the scrapper fingers conform to a contour profile of the surface to level the slurry coating on the surface of the component, wherein the scrapper fingers each comprise a guide probe that is offset from a scrapper finger end to define a desired slurry thickness.

11. The method of claim 10, wherein the guide probe of each of the scrapper fingers is retractable.

12. The method of claim 11, further comprising:
    extending the guide probe of each of the scrapper fingers to perform an initial leveling of the slurry coating; and
    retracting the guide probe of each of the scrapper fingers prior to performing a final leveling of the slurry coating.

13. The method of claim 12, further comprising:
    waiting for a predetermined hardening time between the initial leveling and the final leveling of the slurry coating.

14. The method of claim 10, wherein the contour guide comprises a plurality of contour guide rails, each of the contour guide rails controlling a vertical position of at least one of the scrapper fingers as the scrapper apparatus moves with respect to the component.

15. The method of claim 10, wherein the contour guide further comprises a scrapper frame coupled to the guide frame and a spring bar coupled to the scrapper frame.

16. The method of claim 15, further comprising:
    adjusting positioning of the scrapper fingers to trace the contour profile of the surface of the component by the scrapper fingers, each of the scrapper fingers respectively coupled to a spring that is coupled to the spring bar.

17. The method of claim 10, wherein the scrapper fingers each comprise a scrapper finger end that is substantially planar.

18. The method of claim 10, further comprising:
    controlling movement of the guide frame relative to the component within an enclosure.

* * * * *